DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MARCH 14, 1972

896 O.G. 420

T896,024

PHOTOGRAPHIC ELEMENTS, COMPOSITIONS AND PROCESSES USING EUTECTIC COMPOSITIONS

Howard A. Miller and Richard W. Henn, both % Eastman Kodak Co., Kodak Park Division, Rochester, N.Y. 14650

Filed Dec. 21, 1970, Ser. No. 100,436
Int. Cl. G03c *5/30*
U.S. Cl. 96—66.3
No Drawing. 20 Pages Specification

In an image reproduction process wherein a latent image is developed employing a silver halide processing agent in a liquid medium, the liquid medium can be provided by intimately bringing together under ambient conditions at least two eutectic precursors each of which is solid under ambient conditions but which form a liquid medium in intimate contact. A photographic element containing urethane can be pressed on a solid composition containing a processing agent, such as a silver halide developing agent and a development activator, and a eutectic precursor which is 2,2-diethyl-1,3-propanediol; 2,2,4-trimethyl-1,3-pentanediol; 2-butyne-1,4-diol; and/or 1,3-dimethylurea, to form a liquid medium. Various addenda employed in photographic elements, such as developers, accelerators, hardeners, antifoggants, fixing agents, stabilizing agents, dye and the like can be employed with the described eutectic precursors.